US009606792B1

(12) United States Patent
Andoh et al.

(10) Patent No.: US 9,606,792 B1
(45) Date of Patent: Mar. 28, 2017

(54) MONITORING COMMUNICATION QUALITY UTILIZING TASK TRANSFERS

(71) Applicant: International Business Machines Corporation, Armonk, NY (US)

(72) Inventors: Yasuko Andoh, Tokyo (JP); Kazuro Haga, Tokyo (JP); Katsuroh Hayashi, Kanagawa (JP); Nozomu Matsushita, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/940,478

(22) Filed: Nov. 13, 2015

(51) Int. Cl.
G06F 9/44 (2006.01)
G06F 9/48 (2006.01)

(52) U.S. Cl.
CPC .............. *G06F 8/70* (2013.01); *G06F 9/4881* (2013.01)

(58) Field of Classification Search
CPC .................................. G06F 8/70; G06F 9/4881
See application file for complete search history.

(56) References Cited

U.S. PATENT DOCUMENTS

| 6,337,850 | B1 * | 1/2002 | Nakano | G06F 9/4881 370/230 |
| 6,363,472 | B1 * | 3/2002 | Linnermark | G06F 8/70 712/36 |
| 6,466,932 | B1 * | 10/2002 | Dennis | G06F 21/10 707/694 |
| 7,082,457 | B1 | 7/2006 | Burianek et al. | |
| 7,594,232 | B2 * | 9/2009 | Klingman | G06F 9/505 718/104 |
| 8,321,558 | B1 * | 11/2012 | Sirota | G06F 9/5011 709/201 |

(Continued)

FOREIGN PATENT DOCUMENTS

| JP | 2003156723 | 5/2003 |
| JP | 2004362043 | 12/2004 |

OTHER PUBLICATIONS

Jason Stewart et al., "Single Display Groupware: A Model for Co-present Collaboration", [Online], 1999, pp. 286-293, [Retrieved from Internet on Nov. 6, 2016], <http://delivery.acm.org/10.1145/310000/303064/p286-stewart.pdf>.*

(Continued)

*Primary Examiner* — Thuy Dao
*Assistant Examiner* — Ziaul A Chowdhury
(74) *Attorney, Agent, or Firm* — Heslin Rothenberg Farley & Mesiti P.C.

(57) ABSTRACT

A method includes obtaining, by one or more processor, an indication that a first task assigned to a first entity is complete and that a second task is assigned to a second entity (the second task is subsequent to the first task). In response to obtaining the first indication, the one or more processor generates a third task, which includes a transfer task from the first entity to the second entity before the second entity commences the second task. The one or more processor identifies data to be communicated to the second entity by the first entity, before the commencement of the second task by the second entity. The one or more processor obtains an indication that the third task is complete; and in response to obtaining this indication, determines whether during the third task the first entity communicated a predefined portion of the data to the second entity.

17 Claims, 7 Drawing Sheets

(56) References Cited

U.S. PATENT DOCUMENTS

| | | | |
|---|---|---|---|
| 8,666,934 B2 | 3/2014 | Cui et al. | |
| 8,893,118 B2* | 11/2014 | Guminy | G06F 8/70 717/168 |
| 2002/0138679 A1* | 9/2002 | Koning | G06F 9/4881 710/244 |
| 2002/0167903 A1* | 11/2002 | Nakano | G06F 9/4881 370/230 |
| 2004/0244003 A1* | 12/2004 | Perfetto | G06F 9/4881 718/100 |
| 2005/0120108 A1 | 6/2005 | Wisniewski et al. | |
| 2005/0198638 A1* | 9/2005 | Bai | G06F 11/2069 718/100 |
| 2007/0083863 A1* | 4/2007 | Bril | G06F 9/4881 718/100 |
| 2008/0115143 A1* | 5/2008 | Shimizu | G06F 9/5066 718/105 |
| 2008/0209417 A1 | 8/2008 | Jakobson | |
| 2011/0276977 A1* | 11/2011 | van Velzen | G06F 9/5038 718/104 |
| 2012/0158838 A1* | 6/2012 | Memar-Zahedani | G06F 9/4881 709/204 |
| 2012/0254551 A1* | 10/2012 | Kasahara | G06F 8/70 711/143 |
| 2014/0109100 A1* | 4/2014 | Kurihara | G06F 13/1663 718/102 |
| 2014/0181826 A1* | 6/2014 | Wolf | G06F 9/4843 718/102 |
| 2014/0250440 A1* | 9/2014 | Carter | G06F 9/5011 718/105 |
| 2014/0288987 A1 | 9/2014 | Liu | |

OTHER PUBLICATIONS

Daniel Wagner et al., "Towards Massively Multi-user Augmented Reality on Handheld Devices", [Online], 2005, pp. 208-219, [Retrieved from Internet on Nov. 6, 2016], <http://download.springer.com/static/pdf/978/chp%253A10.1007%252F11428572_13.pdf>.*

Kyoung Shin Park et al. "Effects of Network Characteristics on Human Performance in a Collaborative Virtual Environment", [Online], 1999, pp. 1-8, [Retrived from Interent on Nov. 6, 2016], <http://ieeexplore.ieee.org/stamp/stamp.jsp?arnumber=756940>.*

Julita Vassileva et al. "Multi-Agent Multi-User Modeling in I-Help", [Online], 2002, pp. 1-29, [Retrieved fromInternet on Nov. 6, 2016], <http://julita.usask.ca/Texte/USER252-print.pdf>.*

International Business Machines Corporation, "System and Method of Project Management on Instant Messaging Software", IP.com Disclosure No. IPCOM000180617D, Publication Date Mar. 13, 2009.

\* cited by examiner

510 Program obtains an indication that a first task is complete (the first task was completed by a first entity and a second task is assigned to a second entity).

520 Program generates a third task

530 Program identifies data to be communicated to the second entity by the first entity, before the commencement of the second task by the second entity.

540 Program obtains an indication that the third task is complete and determines whether the first entity has communicated a pre-defined portion of the data to the second entity

545 Portion communicated?

555b Program initiates the third task.

550a Program enables the second entity to commence the second task.

550b Program 440 generates an alert.

560 Program obtains data related to the result of the second task and utilizes the data to update any program code for determining whether the first entity has communicated a pre-defined portion of the data to the second entity

MONITORING COMMUNICATION QUALITY UTILIZING TASK TRANSFERS

TECHNICAL FIELD

One or more aspects of the present invention relate to a dynamic and quantitative approach to evaluating the efficacy of transitioning a task in a multi-user environment.

BACKGROUND

In multi-user environments, knowledge is passed between different users when these users collaborate to complete tasks within a given project. Tasks within a given project may include creating documents, implementing software, testing software, configuring resources, etc. Changes within the environment may necessitate that responsibility for completing a given task in a plan is transferred from one user to another.

SUMMARY

Shortcomings of the prior art are overcome and additional advantages are provided through the provision of a method to manage transfers between entities of a computing environment. The method includes, for instance: obtaining, by one or more processor, a first indication, wherein the first indication comprises an indication that a first task assigned to a first entity is complete and that a second task is assigned to a second entity, wherein the second task is subsequent to the first task; in response to the obtaining the first indication, generating, by the one or more processor, a third task, wherein the third task comprises a transfer task from the first entity to the second entity before the second entity commences the second task, wherein the generating comprises identifying, by the one or more processor, data to be communicated to the second entity by the first entity, before the commencement of the second task by the second entity; obtaining, by the one or more processor, a second indication, wherein the second indication comprises an indication that the third task is complete; and in response to obtaining the second indication, determining, by the one or more processor, whether during the third task the first entity communicated a pre-defined portion of the data to the second entity.

Shortcomings of the prior art are overcome and additional advantages are provided through the provision of a computer program product to manage transfers between entities of a computing environment. The computer program product includes, for instance, a computer readable storage medium readable by a processing circuit and storing instructions for execution by the processing circuit for performing a method including: obtaining, by one or more processor, a first indication, wherein the first indication comprises an indication that a first task assigned to a first entity is complete and that a second task is assigned to a second entity, wherein the second task is subsequent to the first task; in response to the obtaining the first indication, generating, by the one or more processor, a third task, wherein the third task comprises a transfer task from the first entity to the second entity before the second entity commences the second task, wherein the generating comprises identifying, by the one or more processor, data to be communicated to the second entity by the first entity, before the commencement of the second task by the second entity; obtaining, by the one or more processor, a second indication, wherein the second indication comprises an indication that the third task is complete; and in response to obtaining the second indication, determining, by the one or more processor, whether during the third task the first entity communicated a pre-defined portion of the data to the second entity.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 5 depicts a workflow incorporating various of aspects of certain embodiments of the present invention;

DETAILED DESCRIPTION

Figure 1:
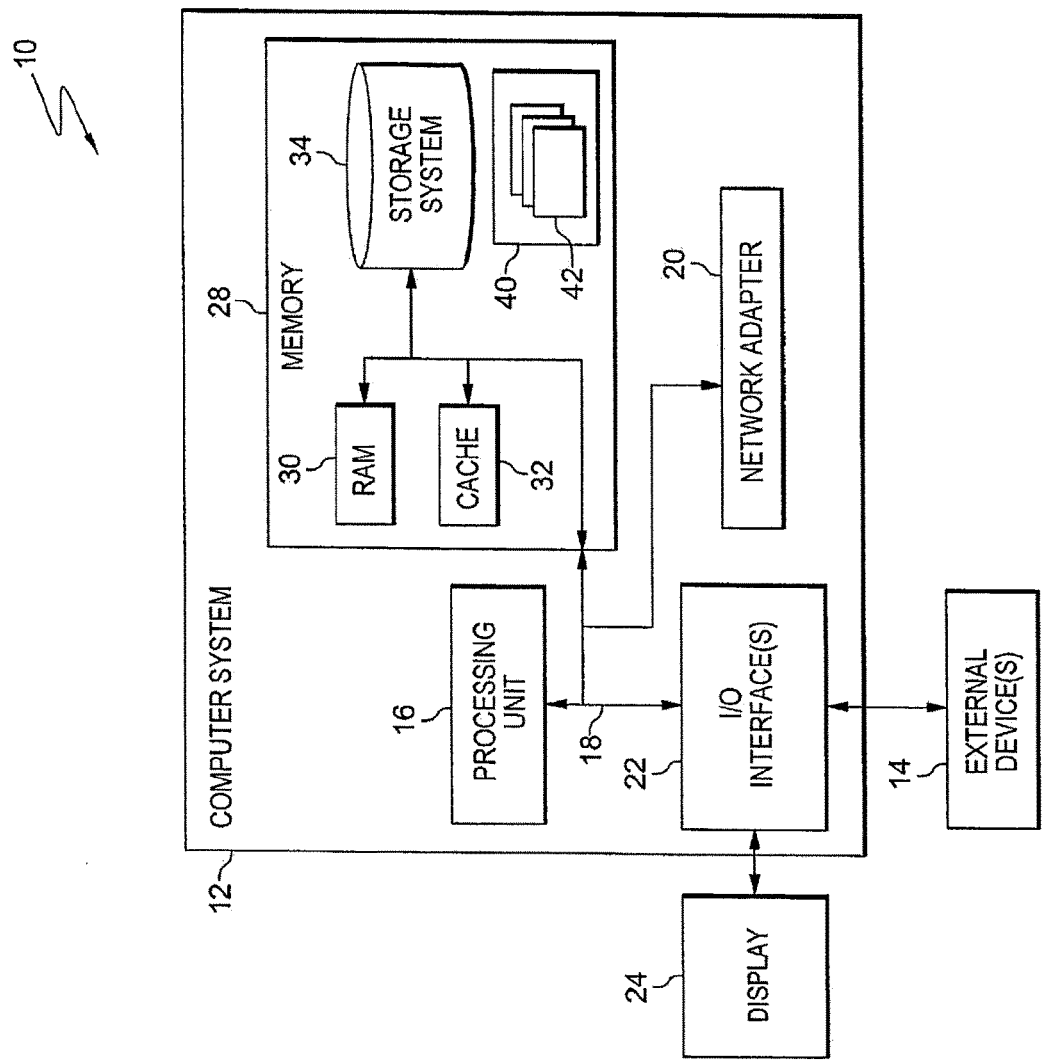
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

In a multi-user computing environment, tasks included in a project may be handled by a variety of different users who may utilize different computing entities and/or processes to complete these tasks. For example, in a project that involves a series of tasks handled by different entities, in order to ensure efficiency throughout the project, the responsibilities of one entity may be transferred to another entity. When a project necessitates a change from one entity to another, the flow and efficiency of certain tasks may be affected. One source of errors is when the entity owning a given task transfers the task, or designates a subsequent task, to another entity. Because the entity transferring the task is responsible for the transfer, there is no quality assurance that the transfer will be handled in a manner that communicates the knowledge required for another entity to assume responsibility for the task or complete the subsequent task.

In an embodiment of the present invention, program code executing on at least one processor obtains an indication that a first task assigned to a first entity is complete and that a second task is assigned to a second entity. In response to obtaining this indication, the program code generates a third task, wherein the third task includes a transfer task from the first entity to the second entity before the second entity commences the second task. As part of generating this third task, the program code identifies data to be communicated to the second entity by the first entity, before the commencement of the second task by the second entity. The program code may assign this third task to the first entity and the second entity. The program code obtains an indication that the third task is complete and the program code determines whether the first entity has communicated a pre-defined portion of the data to the second entity. In response to determining that the first entity communicated the pre-defined portion of the data, the program code enables the second entity to commence the second task. In response to determining the first entity did not communicate the pre-defined portion of the data to the second entity, the program code generates an alert.

Aspects of certain embodiments of the present invention advantageously improve the efficiency of processes and projects by providing an objective and quantitative measure of the efficacy of a transfer from at least one entity to at least another entity during the course of a given project. In one embodiment of the present invention, the project includes tasks, and a first entity is responsible for a preceding task while a second entity is responsible for a subsequent task. In this example, an embodiment of the present invention provides a quantitative measure of the efficacy of the transfer from the first entity, after the completion of the preceding task, to the second entity, in order to commence the subsequent task. In this example, the embodiment evaluates the transfer activity surrounding the transfer of the responsibility from the first entity to the second entity and alerts a third entity, for example, a manager of the project as a whole, if the transfer activity does not meet certain pre-defined parameters. An embodiment of the present invention provides dynamic measures of transfer activity efficacy in order to accommodate a variety of different projects and entity relationships and transfer activities and accurately alert this third entity to any efficiency issues that may arise as a result of a problematic transfer.

Utilizing certain aspects of various embodiments of the present invention improves the overall efficiency of multi-task projects and/or multi-step processes performed in a computing environment and therefore improves the functioning and utilization of the computing resources in the environment as a whole. For example, in an embodiment of the present invention, a communication error (e.g., an incomplete communication between entities that could result in an entity handling a subsequent task without having sufficient information regarding the preceding task to maximize its efficiency when completing the subsequent task) is automatically reported, and thereby the range of impact of the error on a given project or process as a whole can be minimized. In some embodiments of the present invention, by recognizing and communicating these communication errors, the program code assists in eliminating these communication errors overall. The program code thus enables future error prevention by facilitating the return to, or rework of, the preceding task before moving on to the subsequent task. By utilizing certain aspects of embodiments of the present invention, the communication between entities in the system is improved because the program code can recognize (and communicate quantitatively) the improvement or the deterioration of communication between entities during transfers.

In an embodiment of the present invention, the entities represent users. In one non-limiting example, in a project culminating in the integration of a new feature into an existing application, a first user (also called an entity) may be responsible for creating a specification document, while a second user, in response to completion of the specification document, may be responsible for configuring a development environment. Extending this example, subsequent users may be assigned tasks of software development, writing test cases, and performing quality assurance testing.

By quantifying and reporting the efficacy of transfers between entities in a given project, in certain embodiments of the present invention, the program code may compare a given project with other projects and provide information to gauge the efficacy of a given project, in particular when tasks included in this project are performed by multiple entities, as related to similar projects. By comparing an ongoing project with completed projects, the program code can measure the efficacy of the communication between entities throughout the course of the project, as related to previously completed projects that met efficiency goals.

In certain embodiments of the present invention, the efficiency and/or the efficacy of a project may be increased because when the program code analyzes task transfer activities, it may identify, early in a given project, dependencies upon individual skills, or tendencies that enable improvement of communications between entities, and through this early detection, the program code may positively impact the efficiency and/or efficacy of the project. In certain embodiments of the present invention, the program code may identify the cause and/or the solution to a problem during the transfer of responsibility from one entity to another, and this early identification may reduce the remaining work hours for the current task in the project and/or the remaining hours required to complete the project as a whole.

Another advantage of certain embodiments of the invention is that these embodiments may improve as they are utilized. As the program code identifies errors in various processes, the program code can accumulate records of these particular errors and as a result, continuously evaluate and re-set (if needed), thresholds for identifying these errors. Thus, the the program code that identifies issues may be continuously improved through use. In an example where a given project is performed more than once, historical data can be of particular importance. For example, a number of users may be tasked with configuring a group of clients, including but not limited to, personal computers. A first user may be tasked with deploying an image on a given personal computer, while another user is tasked with testing the deployment. As each individual deployment may be considered a new project including two tasks, and the first user and the second user configuring a first machine may be different than the first user and the second user configuring the second machine, capturing data regarding transfers from the first user to the second user enables embodiments of the present invention to continuously evaluate the transfers between the first and the second task.

As aforementioned, advantages of certain embodiments of the present invention may be realized in multi-user and multi-entity computing environments. One such environment in which multiple entities may share responsibilities for the completion of computing tasks that comprise a given project or process in a cloud computing environment. In a cloud computing environment, many entities (users and computing resources) may collaborate in order to complete a given project and thus, the efficiency and/or efficacy lost when responsibility is transferred from one entity to another could impact the project. In this technical environment, tasks in a process are often farmed out to different resources, based on resource availability, in a manner that is transparent to the user. Depending on the resources available for a given task, and the service levels of the entities utilizing those resources, tasks in a project utilizing cloud computing resources may be transferred between different entities in order to exploit the efficiencies of this environment.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
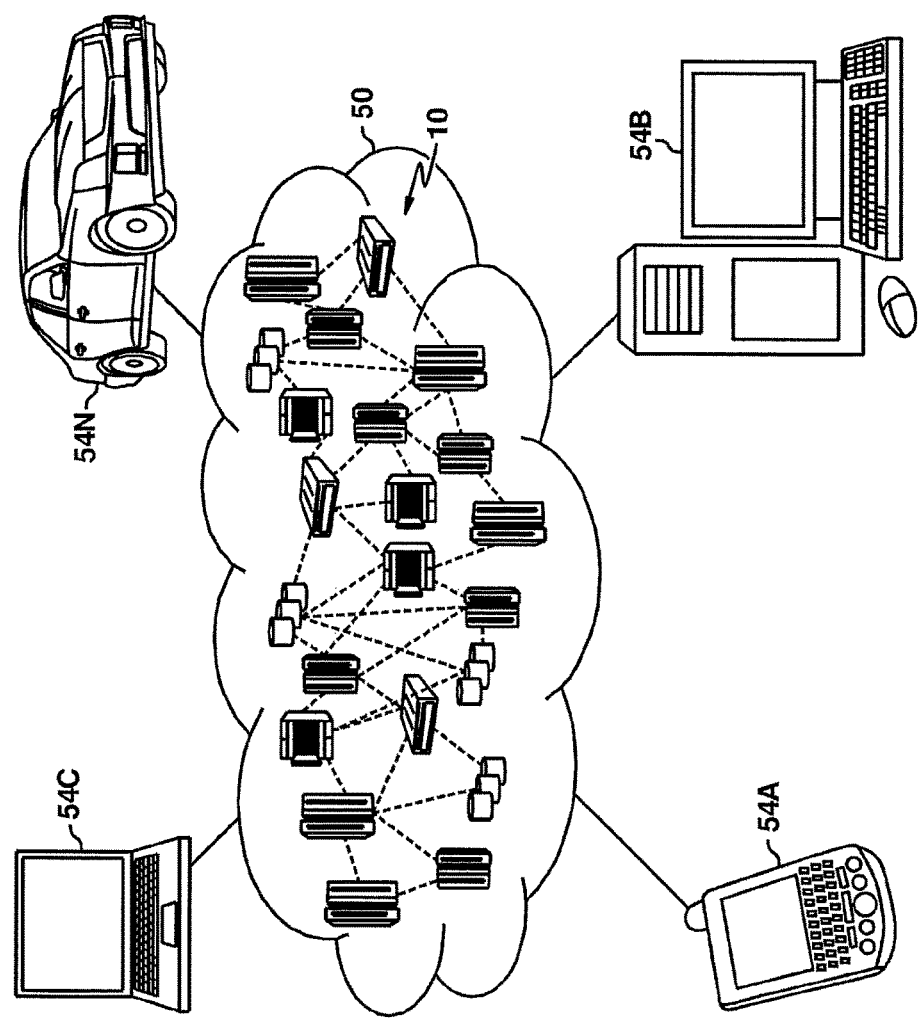
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
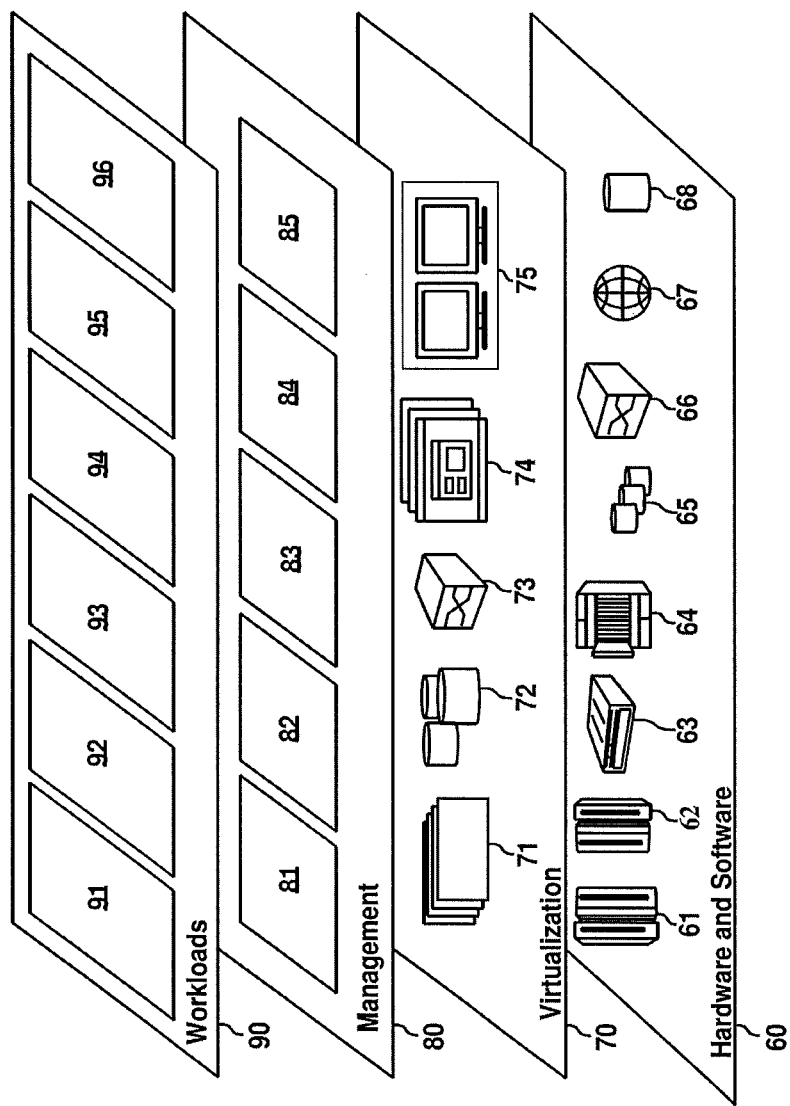
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating the efficacy of the communications between one or more entities when transferring task ownership between these entities 96, as described herein. Element 96 can be understood as one or more program 440 described in FIG. 4.

Figure 4:
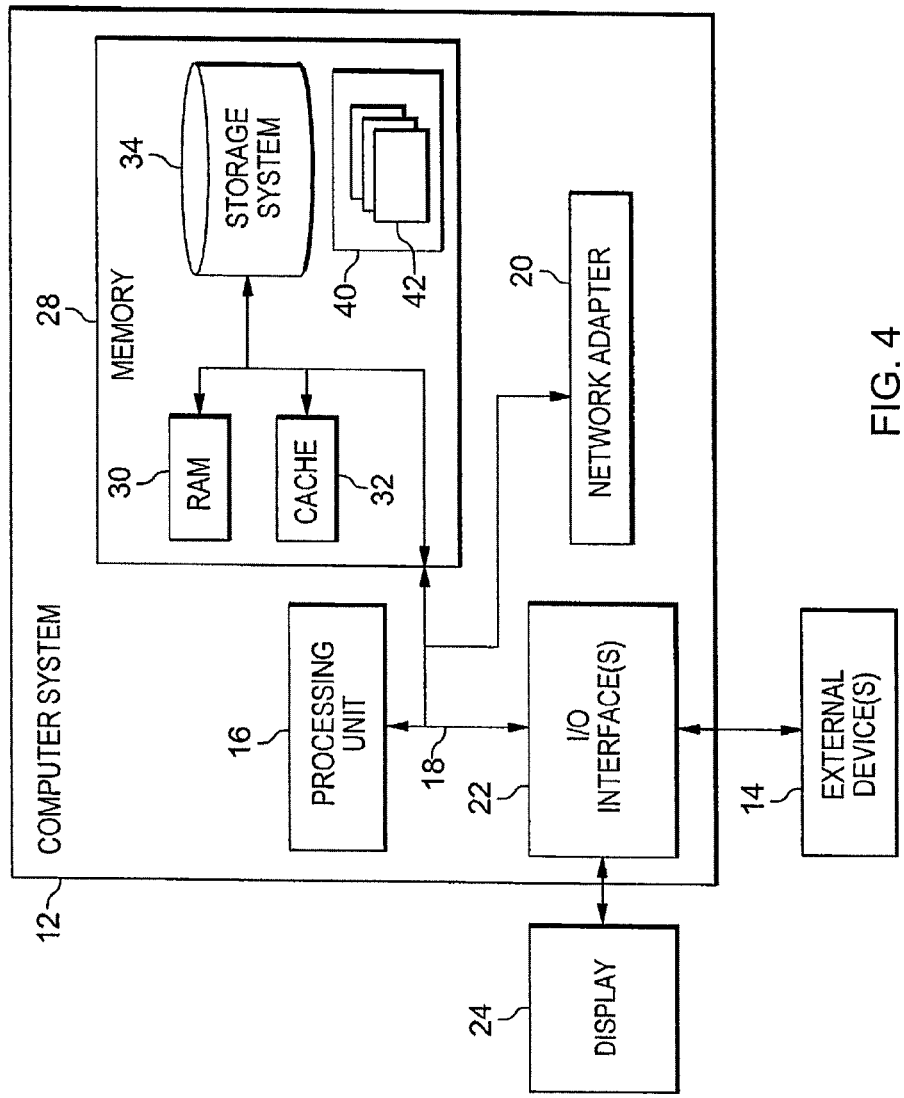
FIG. 4 depicts a hardware overview of a computing node, in accordance with one or more aspects of the present invention.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to evaluate the efficacy of the communications between one or more entities when transferring task ownership between these entities, as described in work layer 96. Program/utility 40 as set forth in FIG. 1 can optionally include additional programs.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 5 depicts a workflow 500 incorporating various aspects of certain embodiments of the present invention. One or more program 440 (FIG. 4) obtains an indication that a first task is complete, where the first task was completed by a first entity and a second task is assigned to a second entity (510).

In response to obtaining the first indication, the one or more program 440 generates a third task (520). The third task can be understood as a transfer task in that the third task includes data to be communicated by the first entity to the second entity related to transferring responsibility for the project (or process) from the first entity to the second entity, before the second entity commences the second task. In an example where a first task precedes a second task, when the tasks are assigned to different entities, the shift of a task from one entity to another can be tracked as a transfer, rather than another task. For clarity, by generating a third task, the order of the tasks in the project or process becomes: the first task, the third task (the transfer task), and then, the second task.

Figure 6:
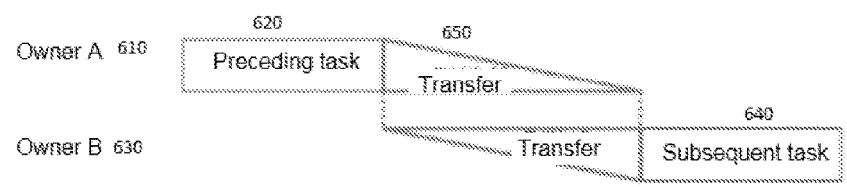
FIG. 6 depicts a transfer from a first entity to a second entity between tasks of a project, in accordance with an embodiment of the present invention.

FIG. 6 depicts a transfer from a first entity to a second entity between tasks of a project, in accordance with an embodiment of the present invention. In FIG. 6, a first entity, Owner A 610, is responsible for a preceding task 620, while a second entity, Owner B 630, is responsible for a subsequent task 640. The transition from Owner A 610 after completing the preceding task 620, to Owner B 630, which will perform the subsequent task 640, is depicted as a transfer 650.

Figure 7:
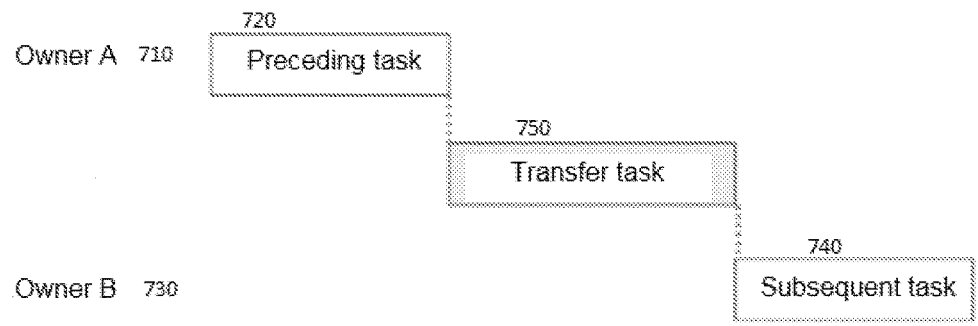
FIG. 7 depicts the generation of a transfer task by one or more programs in an embodiment of the present invention.

In contrast to FIG. 6, FIG. 7 depicts the generation of a transfer task by one or more programs in an embodiment of the present invention. In FIG. 7, one or more program 440 generates the aforementioned third task (an intermittent task between the preceding task and the subsequent task), which is a transfer task. Thus, in FIG. 7, a first entity, Owner A 710, is responsible for a preceding task 720, while a second entity, Owner B 730, is responsible for a subsequent task 740. But the one or more program 440 generated a transfer task 750 for both Owner A 710 and Owner 720 to complete before the one or more program 440 shifts ownership of the process to Owner B 730, which is responsible for the subsequent task 740.

Returning to FIG. 5, as part of generating this third task, the one or more program 440 identifies data to be communicated to the second entity by the first entity, before the commencement of the second task by the second entity (530). The aforementioned communication can be understood as a transfer plan, can include the type of information that the first entity should communicate to the second entity before the second entity commences the subsequent task, the content of the communication, the timing of the communication, the method of communication, etc.

In an embodiment of the present invention, the one or more program 440 assigns this third task (the intermittent task between the first and second task) to the first entity and the second entity. Data identified by the one or more program 440 may vary in accordance with the type of tasks that comprise the project. For example, in an embodiment of the present invention where the first task precedes the second task, for the first entity to communicate information to the second entity that will enable that second entity to effectively and efficiently complete the second task, the one or more program 440 may identify data related to certain attributes. An example of attributes that can be included in the data are noted and described below. After each attribute is an example of what that data may entail.

Who: from designer A to developer B;
What: the content of the approved design document;
Where: in the project room; and
When: before development operation is started;
How: to be explained face to face three times.

Thus, in one non-limiting example, the data (also referred to herein as a communication) is categorized into who, what, where, when and how attributes. Taken together, the attributes describe a communication plan that is part of the third task. This communication plan describes the data that the first entity should communicate to the second entity so that the efficiency of the project can be maintained despite the switch in which entity which is to complete the next task.

Figure 8:
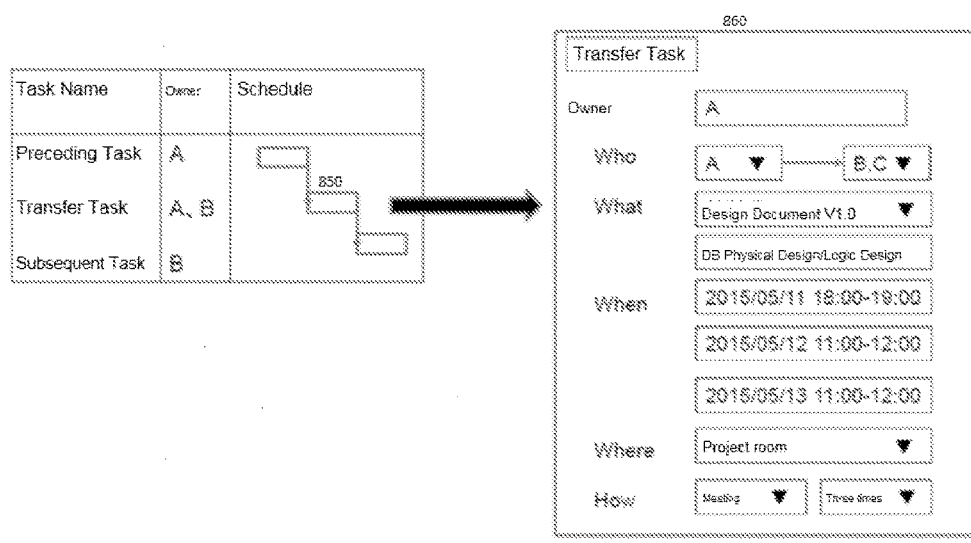
FIG. 8 depicts an example of a transfer task in an embodiment of the present invention.

FIG. 8 depicts an example of a transfer task in an embodiment of the present invention. Transfer task 850 is an example of transfer task 750 in FIG. 7. Specific attributes 860 may include attributes of the transfer task 850, including but not limited to who, what, when, where, and how, as explained above.

Returning to FIG. 5, the one or more program 440 obtains an indication that the third task is complete, and the one or more program 440 determines whether the first entity has communicated a pre-defined portion of the data to the second entity (540). In an embodiment of the present invention, the one or more program 440 compares the data related to the communications between the first entity and the second entity to the communication plan. In an embodiment of the present invention, the one or more program 440 makes this determination based on records of the communications between these entities that one or more program 440 extracts from a memory, for example system memory 28 (FIG. 1).

Table 1 contains examples of electronically obtained and stored information that the one or more program 440 may utilize when evaluating the communications between the first entity and the second entity to determine whether a pre-defined portion of the data identified as part of a communication plan was actually communicated between entities during the third task.

TABLE 1

| Data Attribute | Data Source |
| --- | --- |
| Who | Conference room reservation information, and position information of individuals (e.g., obtained via GPS, CAS, IP address, etc.) in the case of a meeting. A sender and a recipient in an e-mail, telephone call, and/or electronic chat. |

TABLE 1-continued

| Data Attribute | Data Source |
|---|---|
| What | Minutes information and voice conversation audio information (e.g., obtained via text mining), Logs of projectors and printers utilized in a meeting. Attached file to e-mail, email telephone call, and/or electronic chat (e.g., obtained via text mining). |
| Where | Conference room reservation information and position information (e.g., obtained via GPS, CAS, IP address, etc.) |
| When | Conference room reservation information, meeting minutes information, voice conversation audio information (e.g., obtained via text mining) related to the meeting. Information on the transmission date and time in the case of e-mail, telephone call, and and/or electronic chat. |
| How | History log information on the meeting, e-mail, telephone call, and chatting. |

As aforementioned, one advantage of aspects of some embodiments of the present invention is that generating and evaluating a transfer task (e.g., the third task) after completing the task enables the one or more program 440 to identify issues with the communications in the transfer task that could negatively impact the project as a whole and therefore, the efficiency and/or efficacy of the computing system. For example, as will be discussed later, the embodiment of the invention depicted in FIG. 5 illustrates that the one or more program 440 obtains data related to the result of the second task and utilizes the data to update determination logic (560). Below are some examples of issues that may be identified by the one or more program 440 when determining whether the first entity has communicated a pre-defined portion of the data to the second entity.

In one example, the one or more program 440 generates a third task specifying that that entity A should make explanations to entity B in three meetings (e.g., utilizing who and when attributes), but when the one or more program 440 obtains an indication that the third task is complete, the one or more program 440 obtains data indicating that only a single meeting was held between entity A and entity B from the commencement of the transfer task through its completion.

In another example, the one or more program 440 generated a third task specifying that entity A should make explanation to the entity B during a face to face meeting (e.g., utilizing the who, how and where attributes), but when the one or more program 440 obtains an indication that the third task is complete, the one or more program 440 obtains data indicating that the only communication between entity A and entity B during the third task is one e-mail from the entity A to the entity B. In addition, the one or more program 440 determines that there is no record of a question being sent from entity B to the entity A and/or no confirmation was sent in reply from entity B to entity A.

In another example, the one or more program 440 generates a third task specifying that entity A should explain the content of an approved design document to the entity B in a meeting (e.g., utilizing the who and what attributes), but the one or more program 440 determines based on text mining that entity A explained the design document draft instead.

Figure 9:
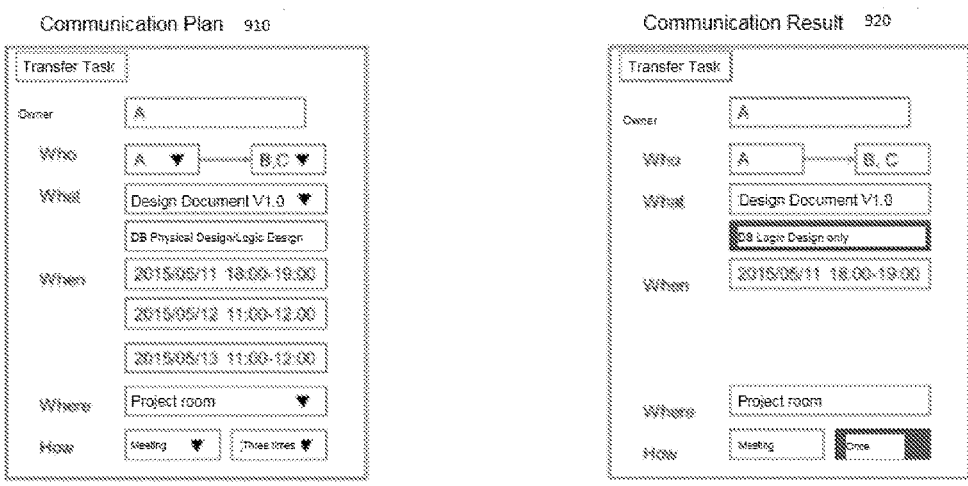
FIG. 9 depicts an example of evaluating the communications between a first entity and a second entity in accordance with an embodiment of the present invention.

FIG. 9 depicts an example of evaluating the communications between a first entity and a second entity in accordance with an embodiment of the present invention. One or more program 440 evaluates the communications between the first entity and the second entity to determine whether a pre-defined portion of the data identified as part of a communication plan was actually communicated between the entities during the third task, the transfer task. FIG. 9 depicts a comparison between a communication plan 910 for a transfer task and the actual communication, termed the communication result 920, as obtained by the one or more program 440. In this example, the one or more program 440 determined that the what and the how attributes both differ between the communication plan 910 and the communication result 920. As aforementioned, the one or more program 440 may obtain the data that includes the actual communication 920 by using text detection and data mining of documents and things retained on a memory accessible to the one or more program 440.

In part, by identifying the differences between the task that one or more program 440 generated and the task completed, the one or more program 440 determines whether the first entity has communicated a pre-defined portion of the data to the second entity. In an embodiment of the present invention, the pre-defined portion of the data is a threshold at which the data communicated is sufficiently close to the data the one or more program 440 specified in generating the task such that the efficiency and/or efficacy of the project and the system is not compromised, or is only compromised within an acceptable tolerance when the second entity commences the second task in response to the completion of the transfer task. In an embodiment of the present invention, the one or more program 440 determines whether the first entity has communicated a pre-defined portion of the data to the second entity by assigning a weighted value to each of the data attributes included in the third task. In an embodiment of the present invention, for each of the attributes (e.g., who, what, where, when, and how), the one or more program 440 may assign a percentage tolerance for differences as a threshold. For ease of understanding, in one non-limiting example, for each of the attributes of who, what, when, where, and how, the one or more program 440 may set 20% of the difference between the data in the task generated by one or more program 440 and the data obtained by the one or more program 440 at the conclusion of the third task as a threshold. In this example, the weighting factors for the five attributes are each defined as 20% (100% in total).

As aforementioned, in an embodiment of the present invention, the data identified by the one or more program 440 to be communicated from the first entity to the second entity during the third task is compared to data obtained by the one or more program 440 in response to completion of this third task. Based upon the comparison, including weighted values assigned to various data attributes, the one or more program 440 determines whether a pre-defined portion of the data was communicated and thus, whether to generate an alert or enable the second entity to process or project to move forward to the next task, in this case, the second task. Equation 1 below is one example of a comparison that the one or more program 440 may use to make this determination.

$$\sum \frac{\text{data identified} - \text{data communicated}}{\text{data identified}} \times \text{weighting factor} \quad \text{(Equation 1)}$$

Tables 2-3 below demonstrate how the one or more program 440 can utilize Equation 1 in an embodiment of the present invention to determine if a first entity has communicated a pre-defined portion of the data to the second entity. Utilizing Equation 1, assume that one or more program 440 weights each of five data attributes (e.g., who, what, where, when, and how) at 20%, and, as represented in Table 2, the data identified differs from the data communicated as related to the what and how attributes. In the example below, the one or more program 440 assigned values to the data identified and the data communicated by converting a keyword matched into numerical values between the data identified and the data communicated, which can also be understood as the data obtained related to the communications between the first entity and the second entity during the transfer task. As another example, if the planned recipients defined by the who attribute were B and C, but the actual recipient was B only, then the one or more program 440 would set the value of the data identified to 2.0 and the actual value to 1.0.

TABLE 2

| Data Attribute | Value of Data Identified | Value of Data Communicated |
| --- | --- | --- |
| What | 2.0 | 1.0 |
| How | 3.0 | 1.0 |

Taking into account the values of Table 2 and Equation 1, Table 3 is an example of how, in an embodiment of the present invention, the one or more program 440 determines whether the first entity has communicated a pre-defined portion of the data to the second entity.

TABLE 3

| Data Attribute | Value of Data Identified | Value of Data Communicated | Weighting Factor | Result |
| --- | --- | --- | --- | --- |
| Who | 1.0 | 1.0 | 0.2 | 0 |
| What | 2.0 | 1.0 | 0.2 | 0.1 |
| Where | 1.0 | 1.0 | 0.2 | 0 |
| When | 1.0 | 1.0 | 0.2 | 0 |
| How | 3.0 | 1.0 | 0.2 | 0.13 |
| Total | | | | 0.23 |

In the example above, assuming that the one or more program 440 determines that a first entity has communicated a pre-defined portion of the data to the second entity if the total (e.g., the obtained determination) is less than or equal to 0.225, because 0.23 is greater than 0.225, in this example, the one or more program generates an alert.

Returning to FIG. 5, in response to determining that the first entity communicated the pre-defined portion of the data (545), the one or more program 440 enables the second entity to commence the second task (550a). In response to determining the first entity did not communicate the pre-defined portion of the data to the second entity (545), the one or more program 440 generates an alert (550b). In a further embodiment of the present invention, the one or more program 440 may also generate an alert in response to determining that the first entity communicated the pre-defined portion of the data. In some embodiments of the present invention, generating the alert may include the one or more program 440 sending the determination via e-mail to one or more predetermined destination(s) that may be registered in advance, for example, to an e-mail address of a project manager. The alert may also include an alert that a user may experience through a graphical user interface. In an embodiment of the present invention, the one or more program 440 may also store this determination. In a further embodiment of the present invention, after the one or more program 440 generates an alert, the one or more program 440 initiates the third task again (555b), rather than enabling the second entity to commence the second task.

In an embodiment of the present invention, in response to the one or more program 440 determining that the first entity has not communicated the pre-defined portion of the data to the second entity, the one or more program 440 changes the status of the third task (the transfer task) to "pending."

In an embodiment of the present invention, in response to the one or more program 440 determining that the first entity has not communicated the pre-defined portion of the data to the second entity, one or more program 440 notifies at least one user with a message, for example, "a problem has been found in the communication."

In an embodiment of the present invention, in response to the second entity completing the second task, the one or more program 440 obtains data related to the result of the second task and utilizes the data to update any program code for determining whether the first entity has communicated a pre-defined portion of the data to the second entity (560). In an embodiment of the present invention that utilizes weighting factors to evaluate different attributes in the data, the one or more program 440 may update the weighting factors based on the result of the second task. An improvement in the execution of the second task enables the one or more program 440 to increase the accuracy of one or more program 440's determinations related to transfer tasks.

In an embodiment of the present invention, in order to improve program code utilized by the one or more program 440, including but not limited to certain weighting factors, as depicted in Table 3 above, applied to the differences between the data that may be referred to as a communication plan and the actual data communicated, the one or more program 440 may first obtain certain inputs. These inputs include, but are not limited to, weighting factors utilized in the aforementioned determinations, data related to historical determinations, information related to tasks subsequent to transfer tasks, and/or data related to past determinations and improvement of the weighting utilized in these historical determinations. Data related to historical determinations obtained by the one or more program 440 may include, but is not limited to, the values of the data identified as related to a transfer task, information related to the data actually communicated during a transfer task, and/or determinations by the one or more program 440 and the reasoning behind the determinations. Information related to tasks subsequent to transfer tasks obtained by the one or more program 440 may include, but is not limited to, the anticipated starting date of tasks, the anticipated date of completion of tasks, and/or the planned hours to complete the tasks.

In an embodiment of the present invention, based on an indication that the second task in complete, the one or more program 440 updates the program code that one or more program 440 uses in determining whether the first entity has communicated a pre-defined portion of the data to the second entity by performing a correlation analysis between the data identified (the planned result) and the data communicated (the actual result) for data associated with each attribute of a transfer task. In this analysis, the value is 0 if the actual results are as planned. The one or more program 440 also analyzes any deviation in hours utilized to complete tasks, contrasting the number of hours utilized to complete a given task with the hours anticipated to complete the task. The one or more program 440 assigns the value is 0 if the actual results are as planned. The one or more program 440 updates weighting factors so that the weighting factors for any item having a higher correlation becomes larger than the value prior to being updated.

In an embodiment of the present invention, if the one or more program 440 identifies no difference between a planned period to complete the task subsequent to a transfer task and the actual period utilized to complete this subsequent task, the one or more program 440 may lower the sensitivity of the weighting factors that one or more program 440 utilizes in determining whether the pre-defined portion of data has been transferred during the transfer task. The one or more program 440 may lower the sensitivity regardless of whether one or more program 440 generated an alert based on the portion of the pre-defined data communicated.

Conversely, in an embodiment of the present invention, if the one or more program 440 identifies a difference between a planned period to complete the task subsequent to a transfer task and the actual period utilized to complete this subsequent task, the one or more program 440 may raise the sensitivity of the weighting factors that one or more program 440 utilizes in determining whether the pre-defined portion of data has been transferred during the transfer task. The one or more program 440 may lower the sensitivity regardless of whether one or more program 440 generated an alert based on the portion of the pre-defined data communicated.

In an embodiment of the present invention, after the one or more program 440 has performed a correlation analysis between the planned and actual periods utilized by the second entity to complete the second task (e.g., the task subsequent to a transfer task, the one or more program 440 may calculate an update range on the basis of this analysis and the past determination history and the history of improvement of the determination logic weighting. The one or more program 440 may then update the determination logic.

Table 4 illustrates an example of how after the completion of a task subsequent to a transfer task, the one or more program 440 updates the program code used to determine whether during the transfer task a pre-defined portion of the data was communicated between the first entity and the second entity. In this, example, the values are equivalent to those in Tables 2-3, however, the weighting factor for data associated with the what and how attributes has been updated. The one of more program 440 has assigned a greater weight to the what attribute and a lower weight to the how weighting factor. As a result of the one or more program 440 adjusting the weighting factors. the result differs, and the one or more program 440 does not generate an alert.

TABLE 4

| Data Attribute | Value of Data Identified | Value of Data Communicated | Weighting Factor | Result |
| --- | --- | --- | --- | --- |
| Who | 1.0 | 1.0 | 0.2 | 0 |
| What | 2.0 | 1.0 | 0.3 | 0.15 |
| Where | 1.0 | 1.0 | 0.2 | 0 |
| When | 1.0 | 1.0 | 0.2 | 0 |
| How | 3.0 | 1.0 | 0.1 | 0.07 |
| Total | | | | 0.22 |

Returning to the example explained in reference to Table 3, the one or more program 440 generates an alert if the total is greater than or equal to 0.225. Thus, here, based on the changes to the weighting factors, i.e., the change in program code, the one or more program 440 enables the second entity to commence the second task (550*a*).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining, by one or more processor, a first indication, wherein the first indication comprises an indication that a first task assigned to a first entity is complete and that a second task is assigned to a second entity, wherein the second task is performed subsequent to the first task;
    in response to the obtaining the first indication, generating, by the one or more processor, a third task, wherein the third task comprises a transfer task from the first entity to the second entity before the second entity commences the second task, wherein the generating comprises identifying, by the one or more processor, data to be communicated to the second entity by the first entity, before the commencement of the second task by the second entity, wherein the data is utilized by the second entity during execution by the second entity of the second task;

obtaining, by the one or more processor, a second indication, wherein the second indication comprises an indication that the third task is complete;

in response to obtaining the second indication, determining, by the one or more processor, whether during the third task the first entity communicated a pre-defined portion of the data to the second entity, wherein the determining comprises:

assigning, by the one or more processor, the data to a pre-defined group of attributes;

assigning, by the one or more processor, a weight to each attribute; and determining, by the one or more processor, whether the first entity communicated the pre-defined portion to the second entity by multiplying, for each attribute, the weight associated with the attribute by a value representing a difference between the data and the communicated data for the attribute.

2. The method of claim 1, further comprising:
in response to determining that the first entity communicated the pre-defined portion of the data to the second entity, enabling, by the one or more processor, the second entity to commence the second task.

3. The method of claim 1, further comprising:
obtaining, by the one or more processor, a third indication, wherein the third indication comprises an indication that the second task is complete; and
updating, by the one or more processor, a value representing the pre-defined portion of the data.

4. The method of claim 1, further comprising:
assigning, by the one or more processor, the third task to the first entity and to the second entity.

5. The method of claim 1, wherein the second indication comprises at least one of: setting, by the one or more processor, the status of the third task to pending, or sending, by the one or more processor, a message to a user.

6. The method of claim 2, further comprising:
retaining, by the one or more processor, on a memory, a result of the determining.

7. The method of claim 3, wherein the updating comprises:
obtaining, by the one or more processor, a difference between a planned period to complete the second task and an actual period to complete the second task; and
based on the difference being within a threshold, lowering the value representing the predefined portion of data.

8. The method of claim 1, where the first task precedes the second task in a process.

9. The method of claim 1, wherein the first entity and the second entity are distinct from each other.

10. A computer program product comprising:
a computer readable storage medium readable by one or more processor and storing instructions for execution by the one or more processor for performing a method comprising:
obtaining, by the one or more processor, a first indication, wherein the first indication comprises an indication that a first task assigned to a first entity is complete and that a second task is assigned to a second entity, wherein the second task is performed subsequent to the first task;

in response to the obtaining the first indication, generating, by the one or more processor, a third task, wherein the third task comprises a transfer task from the first entity to the second entity before the second entity commences the second task, wherein the generating comprises identifying, by the one or more processor, data to be communicated to the second entity by the first entity, before the commencement of the second task by the second entity, wherein the data is utilized by the second entity during execution by the second entity of the second task;

obtaining, by the one or more processor a second indication, wherein the second indication comprises an indication that the third task is complete;

in response to obtaining the second indication, determining, by the one or more processor, whether during the third task the first entity communicated a pre-defined portion of the data to the second entity, wherein the determining comprises:

assigning, by the one or more processor, the data to a pre-defined group of attributes;

assigning, by the one or more processor, a weight to each attribute; and determining, by the one or more processor, whether the first entity communicated the pre-defined portion to the second entity by multiplying, for each attribute, the weight associated with the attribute by a value representing a difference between the data and the communicated data for the attribute.

11. The computer program product of claim 10, the method further comprising:
in response to determining that the first entity did not communicate the pre-defined portion of the data to the second entity, generating, by the one or more processor, an alert.

12. The computer program product of claim 10, the method further comprising:
obtaining, by the one or more processor, a third indication, wherein the third indication comprises an indication that the second task is complete; and
updating, by the one or more processor, a value representing the pre-defined portion of the data.

13. The computer program product of claim 10, the method further comprising:
assigning, by the one or more processor, the third task to the first entity and to the second entity.

14. The computer program product of claim 12, wherein the updating comprises:
obtaining, by the one or more processor, a difference between a planned period to complete the second task and an actual period to complete the second task; and
based on the difference being outside of the threshold, raising the value representing the pre-defined portion of the data.

15. A system comprising:
a memory;
one or more processor in communication with the memory; and
program instructions executable by the one or more processor via the memory to perform a method, the method comprising:
obtaining, by the one or more processor, a first indication, wherein the first indication comprises an indication that a first task assigned to a first entity is complete and that a second task is assigned to a second entity, wherein the second task is performed subsequent to the first task;

in response to the obtaining the first indication, generating, by the one or more processor, a third task, wherein the third task comprises a transfer task from the first entity to the second entity before the second entity commences the second task, wherein the generating comprises identifying, by the one or more processor, data to be communicated to the second entity by the first entity, before the commencement of the second task by the second entity, wherein the data is utilized by the second entity during execution by the second entity of the second task;

obtaining, by the one or more processor a second indication, wherein the second indication comprises an indication that the third task is complete;

in response to obtaining the second indication, determining, by the one or more processor, whether during the third task the first entity communicated a pre-defined portion of the data to the second entity, wherein the determining comprises:

assigning, by the one or more processor, the data to a pre-defined group of attributes;

assigning, by the one or more processor, a weight to each attribute; and determining, by the one or more processor, whether the first entity communicated the pre-defined portion to the second entity by multiplying, for each attribute, the weight associated with the attribute by a value representing a difference between the data and the communicated data for the attribute.

16. The system of claim 15, the method further comprising:

in response to determining that the first entity communicated the pre-defined portion of the data to the second entity, enabling, by the one or more processor, the second entity to commence the second task.

17. The system of claim 15, the method further comprising:

obtaining, by the one or more processor, a third indication, wherein the third indication comprises an indication that the second task is complete; and updating, by the one or more processor, a value representing the pre-defined portion of the data.

\* \* \* \* \*